(12) United States Patent
Kawauchi et al.

(10) Patent No.: US 8,383,717 B2
(45) Date of Patent: Feb. 26, 2013

(54) SYNTHETIC POLYMERS CONTROLLED IN SPIRAL STRUCTURE, HOST-GUEST COMPOUNDS PREPARED BY USING THE SAME, AND PROCESSES FOR PRODUCTION OF BOTH

(75) Inventors: Takehiro Kawauchi, Toyohashi (JP); Jiro Kumaki, Yonezawa (JP); Eiji Yashima, Nagoya (JP)

(73) Assignee: Japan Science and Technology Agency, Saitama (JP)

( * ) Notice: Subject to any disclaimer, the term of this patent is extended or adjusted under 35 U.S.C. 154(b) by 22 days.

(21) Appl. No.: 12/599,455

(22) PCT Filed: Mar. 18, 2008

(86) PCT No.: PCT/JP2008/000636
§ 371 (c)(1),
(2), (4) Date: Feb. 15, 2011

(87) PCT Pub. No.: WO2008/139674
PCT Pub. Date: Nov. 20, 2008

(65) Prior Publication Data
US 2011/0144262 A1    Jun. 16, 2011

(30) Foreign Application Priority Data
May 9, 2007  (JP) ................. 2007-125098

(51) Int. Cl.
*C08K 3/04*     (2006.01)
*C08L 33/00*    (2006.01)
(52) U.S. Cl. ........................ 524/495; 524/523
(58) Field of Classification Search ............ 524/495
See application file for complete search history.

(56) References Cited

U.S. PATENT DOCUMENTS
5,312,881 A * 5/1994 Marks et al. ............... 526/126

FOREIGN PATENT DOCUMENTS
JP        2008-056864 A    3/2008

OTHER PUBLICATIONS

Kawauchi et al., Macromolecules, 38, 9155-9160, 2005.*
Kawauchi et al., Journal of American Chemical Society, 128, 10560-10567, 2006.*
Yashima, Polymer Preprints, 57(1):34-36 (2008).
Sakano et al., Polymer Preprints, 57(1):525 (2008).
Kawauchi et al., Polymer Preprints, 57(1):602 (2008).
Kumaki et al., Polymer Preprints, 57(1):860 (2008).
Zong-Quan et al., Polymer Preprints, 57(1):964 (2008).
Yashima et al., Macromolecules, 41(1):3-12 (2008).
T. Nakano et al., "Asymmetric Polymerization of Methacrylates", Macromol. Rapid Commun., vol. 21, pp. 603-612 (2000).
T. Kawauchi et al., "Stereocomplex Formation of Isotactic and Syndiotactic Poly(methylmethacrylate)s in Ionic Liquids Leading to Thermoreversible Ion Gels", Macromolecules, vol. 38, pp. 9155-9160 (2005).
W. Liu et al., "Block copolymerization of triphenylmethyl methacrylate with other methacrylates using (−)-sparteine/9-fluorenyl-lithium as an initiator", Macromol. Chem. Phys., vol. 198, pp. 279-290 (1997).
H. Kusuyama et al., "Structural change of st-PMMA on drawing, absorption and desorption of solvents", Polymer, vol. 23, pp. 1256-1258 (1982).
Office Action issued in corresponding Japanese Patent Application No. JP 2009-513980, mailed Dec. 25, 2012.

* cited by examiner

*Primary Examiner* — Hui Chin
(74) *Attorney, Agent, or Firm* — Edwards Wildman Palmer LLP; Peter F. Corless; Christine C. O'Day

(57) ABSTRACT

The invention provides a process for producing spiral polymers controlled in the direction of spiral winding easily from inexpensive general-purpose polymers; and spiral polymers controlled in the direction of spiral winding. The invention relates to a process for the production of syndiotactic polymethacrylate- or polyacrylate-type spiral polymers controlled in the direction of spiral winding which comprises dissolving a syndiotactic polymethacrylate- or polyacrylate-type polymer and a chiral compound in a solvent preferably under heating, subjecting the obtained solution to cooling or concentration to form a solid matter, and separating the solid matter; and so on.

6 Claims, 3 Drawing Sheets

[Fig. 1]
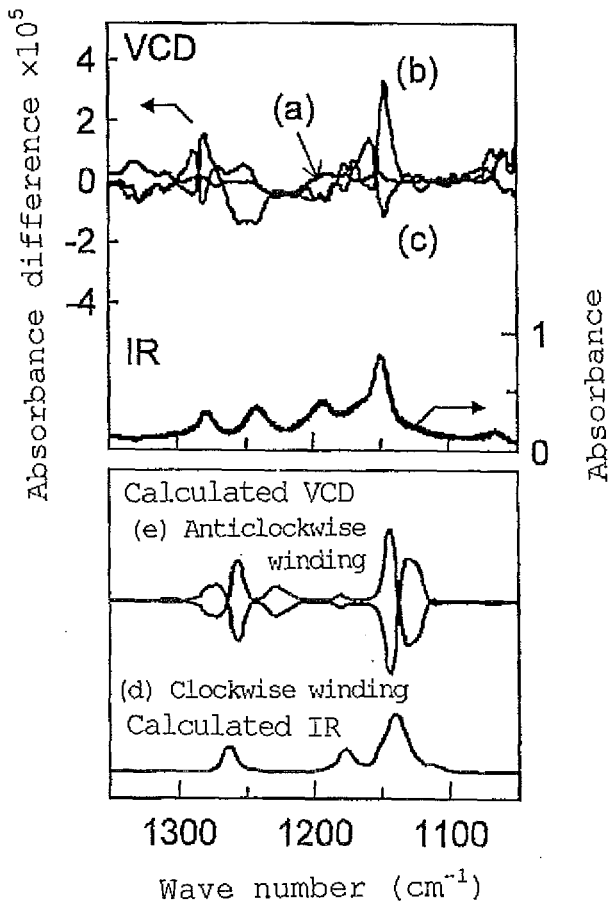
[Fig. 2]
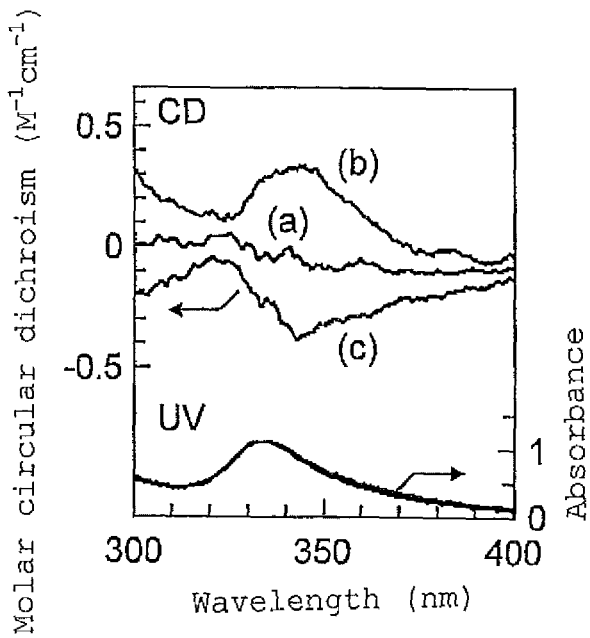

[Fig. 3]
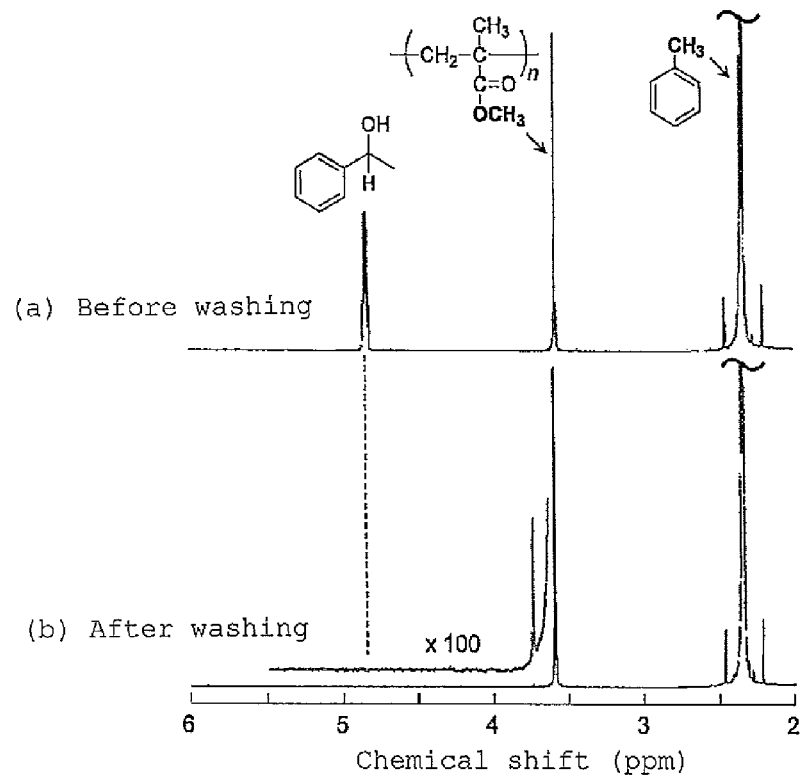
[Fig. 4]
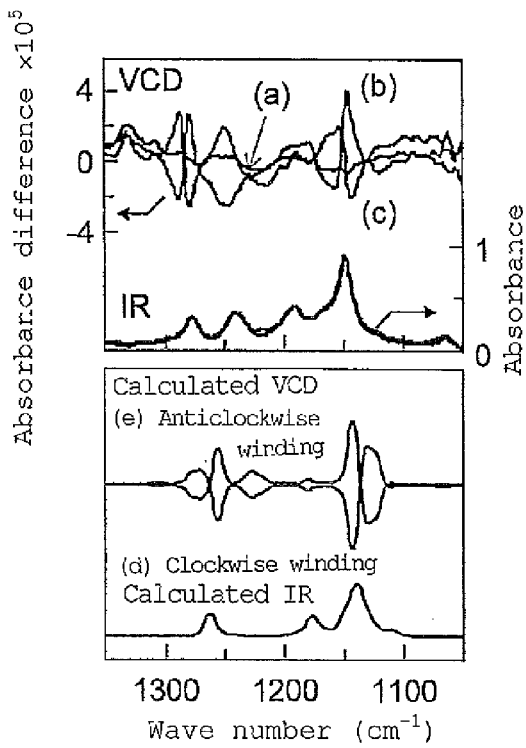

[Fig. 5]
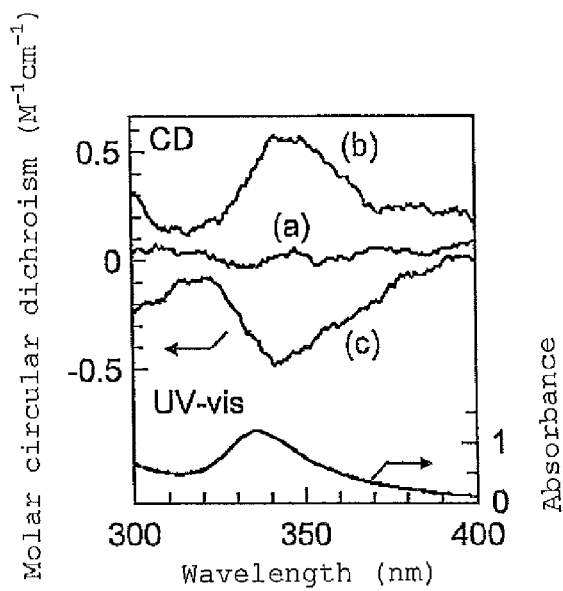
[Fig. 6]
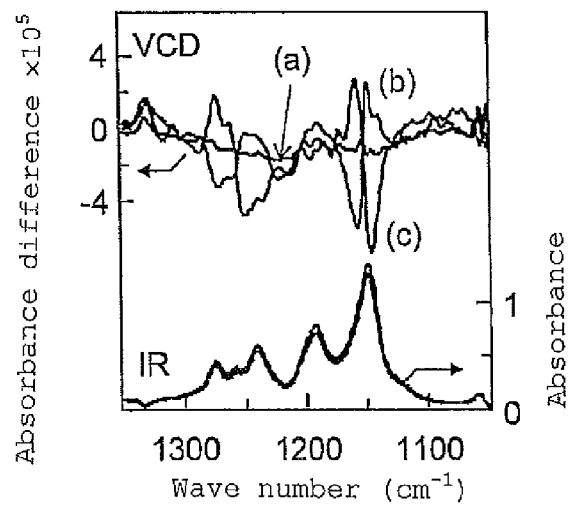
[Fig. 7]
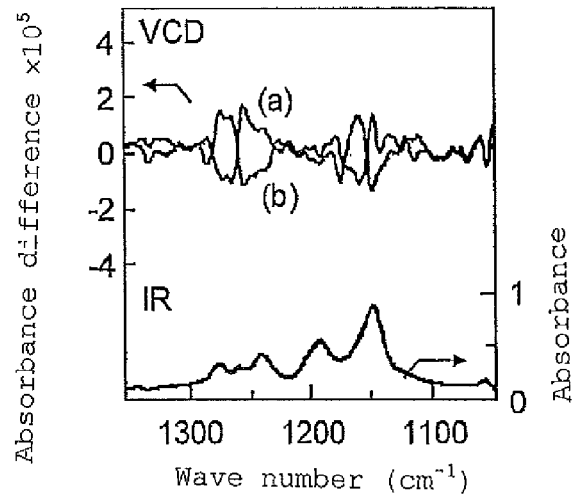

SYNTHETIC POLYMERS CONTROLLED IN SPIRAL STRUCTURE, HOST-GUEST COMPOUNDS PREPARED BY USING THE SAME, AND PROCESSES FOR PRODUCTION OF BOTH

TECHNICAL FIELD

The present invention relates to a process for producing a spiral macromolecular compound in which the direction of spiral in the spiral structure of a syndiotactic polymethacrylate-type or syndiotactic polyacrylate-type spiral macromolecular compound is controlled, a process for controlling the direction of spiral in a spiral structure, and spiral macromolecular compounds produced by these processes. More particularly, the invention relates to a process for controlling the direction of spiral in these spiral macromolecular compounds by using a small amount of a chiral compound, and controlled spiral macromolecules. The invention also relates to a host-guest compound having a guest compound included in the interior of a spiral macromolecule that is controlled in the direction of spiral, and a process for producing the same.

BACKGROUND ART

It is known that syndiotactic polymethyl methacrylate (hereinafter, may be abbreviated to st-PMMA) forms a spiral structure when an organic solvent such as toluene or acetone is incorporated, and undergoes gelation or crystallization (see Non-Patent Documents 1 to 3). The crystal structure usually adopts a spiral conformation that is loosely wound at about 18/1, and the interior of the spiral has a space measuring about 1 nm in diameter, in which space solvent molecules are included.

The inventors of the present invention have already completed an invention relating to a fullerene-macromolecule complex in which fullerene is included inside the spiral conformation of a syndiotactic polymethacrylate-type or syndiotactic polyacrylate-type polymer, and a process for producing the same, and filed a patent application thereon (see Patent Document 1).

Examples reported hitherto to control the direction of spiral winding using a general-purpose polymer, are limited to polymethacrylate-type or polyacrylate-type isotactic polymers, and are also limited to macromolecules having a structure with bulky side chains. The direction of winding of a resulting spiral polymer was determined by the chiral initiator or auxiliary agent used in the polymerization reaction, and the polymer had a static spiral structure that could not be altered thereafter (Non-Patent Document 4).

As a methacrylic acid ester polymer having such a unidirectionally wound spiral structure, isotactic poly(triphenylmethyl methacrylate) is well known (for example, Non-Patent Document 5). This unidirectionally wound polymer has been put to practical use in columns for separation of chiral compounds. However, such a polymer has a disadvantage that the bulky tertiary ester group is prone to undergo hydrolysis and easily changes to carboxylic acid, and as a result, the spiral structure is readily destroyed (Non-Patent Document 6). Furthermore, since the raw material is a special ester called triphenylmethyl ester and is not a general-purpose monomer, there is another disadvantage that the synthesis processes are complicated, and the production cost goes up. This has been a significant problem in the practical use of the polymer.

Patent Document 1: Japanese Patent Application No. 2006-238368

Non-Patent Document 1: Kusuyama, H.; Takase, M.; Higashihata, Y.; Tseng, H.; Chatani, Y.; Tadokoro, H. Polymer, 1982, 23, 1256.

Non-Patent Document 2: Kusuyama, H.; Miyamoto, N.; Chatani, Y.; Tadokoro, H. Polymer 1983, 24, 119.

Non-Patent Document 3: Berghmans, M.; Thihs, S.; Cornette, M.; Berghmans, H.; Schryver, F. C. Macromolecules 1994, 27, 7669.

Non-Patent Document 4: Nakano, T.; Okamoto, Y. Chem. Rev. 2001, 101, 4013.

Non-Patent Document 5: Okamoto, Y.; Suzuki, K.; Ohta, K.; Hatada, K.; Yuki, H. J. Am. Chem. Soc. 1979, 101, 4763.

Non-Patent Document 6: Okamoto, Y.; Yashima, E.; Ishikura, M.; Hatada, K. Polym. J. 1987, 19, 1183.

Non-Patent Document 7: Spevacek, J.; Schneider, B. Adv. Colloid Interface Sci. 1987, 27, 81.

Non-Patent Document 8: Yoshida, Z.; Takekuma, H.; Takekuma, S.; Matsubara, Y. Angew. Chem. Int. Ed. Engl. 1994, 33, 1597.

DISCLOSURE OF THE INVENTION

Problems to be Solved by the Invention

An object of the present invention is to provide a process for conveniently producing a spiral macromolecule wound in any desired direction, from an inexpensive, general-purpose macromolecule, and a spiral macromolecule that is controlled in the direction of winding. Another object of the invention is to provide a process for producing a host-guest compound having a guest compound included in the interior of a spiral macromolecule that is controlled in the direction of winding, and a host-guest compound obtained by the process.

Means for Solving the Problems

The inventors of the present invention have been engaged in the development of stable spiral structures based on syndiotactic polymethacrylate-type and syndiotactic polyacrylate-type polymers. The inventors have found that spiral structures which are stable in the presence of guest compounds such as fullerene, can be obtained (see Patent Document 1). However, it was not possible to control the direction of winding of the spiral structure, so that only mixtures of clockwise-wound spiral structures and anticlockwise-wound spiral structures could be obtained, and processes for the separation of these had not even been developed yet. Thus, the inventors have conducted an investigation on a process for selectively producing a spiral structure having any desired direction of winding.

Syndiotactic polymethacrylate-type or syndiotactic polyacrylate-type polymers has been such that if a solvent such as toluene, or a guest compound such as fullerene is not present, a stable spiral structure cannot be obtained, and the production of a spiral structure itself is difficult. Therefore, it has been very difficult to control the direction of winding. The inventors of the present invention conducted investigations more diligently, and as a result, they found a surprising phenomenon that upon gelation or crystallization of these polymers in a solvent, if a small amount of a chiral compound is incorporated to be co-present with the polymers, the direction of spiral can be controlled, and even after removing this chiral compound, this spiral structure having this controlled direction of winding is maintained intact and remembered. Thus, the inventors finally completed the present invention.

As a result of further investigations conducted by the inventors of the present invention, the chiral compound to be added is capable of controlling the direction of spiral precisely and surely even in a trace amount, and once the direction of winding is fixed, the chiral compound can be removed by washing the gel or crystals using an appropriate solvent. Moreover, even after the chiral compound has been removed, the spiral structure is stably maintained. In this regard, it is thought that the chiral compound participates in the formation of a spiral structure under an operating mechanism that is different from the mechanisms involving a solvent such as toluene, or a guest compound such as fullerene. It is considered surprising that the direction of winding of the spiral structure is controlled even though there is neither covalent bonding nor strong intermolecular force such as hydrogen bonding or ionic interaction, between the polymer and the chiral compound.

As such, in regard to syndiotactic polymethacrylate-type or syndiotactic polyacrylate-type polymers, the process of winding of the spiral structure can be controlled in the presence of a chiral compound, and once the spiral structure is stabilized by gelation or crystallization, the chiral compound can be removed. The chiral compound thus removed can be easily reused.

Furthermore, the inventors of the present invention also found that a host-guest compound may be obtained while maintaining the chiral structure, by introducing a guest compound into the interior of the macromolecule thus obtained, which has a controlled spiral structure.

That is, the present invention relates to a process for producing a syndiotactic polymethacrylate-type or syndiotactic polyacrylate-type polymer spiral macromolecular compound that is controlled in the direction of winding of the spiral structure, the process including dissolving, preferably dissolving by heating, a syndiotactic polymethacrylate-type or syndiotactic polyacrylate-type polymer and a chiral compound in a solvent, and then separating a solid matter generated by cooling, concentration or the like, that is, solid components such as a gelation product or a crystallization product.

The present invention also relates to a process for producing a host-guest compound which includes a guest compound in the interior of the spiral structure of a syndiotactic polymethacrylate-type or syndiotactic polyacrylate-type polymer spiral macromolecular compound that is controlled in the direction of winding of the spiral structure, the process including further adding a guest compound to thereby introduce the guest compound into the spiral structure, in connection with the process for producing a syndiotactic polymethacrylate-type or syndiotactic polyacrylate-type polymer spiral macromolecular compound that is controlled in the direction of winding of the spiral structure, in which process a syndiotactic polymethacrylate-type or syndiotactic polyacrylate-type polymer and a chiral compound are dissolved, preferably dissolved by heating, in a solvent, and then a solid matter generated by cooling, concentration or the like, that is, solid components such as a gelation product or a crystallization product, is separated.

The present invention also relates to a process for controlling the direction of winding of the spiral structure of a syndiotactic polymethacrylate-type or syndiotactic polyacrylate-type spiral macromolecular compound, the process including incorporating a chiral compound to be co-present with a syndiotactic polymethacrylate-type or syndiotactic polyacrylate-type polymer in a solvent, and thereby controlling the direction of winding of the spiral structure of the syndiotactic polymethacrylate-type or syndiotactic polyacrylate-type spiral macromolecular compound in accordance with the chirality of the chiral compound. This process can also be used as a process for controlling the direction of winding of the spiral structure of a host-guest compound having a guest molecule included in the interior of the spiral structure of a syndiotactic polymethacrylate-type or syndiotactic polyacrylate-type polymer spiral macromolecular compound that is controlled in the direction of winding of the spiral structure, the process including further adding a guest compound, and thereby introducing the guest compound into the spiral structure.

The present invention also relates to a syndiotactic polymethacrylate-type or syndiotactic polyacrylate-type spiral macromolecular compound that is controlled in the direction of winding, which can be produced by these processes, and a host-guest compound having a guest molecule included in the interior of the spiral structure of a syndiotactic polymethacrylate-type or syndiotactic polyacrylate-type polymer spiral macromolecular compound that is controlled in the direction of winding of the spiral structure.

The present invention also relates to a syndiotactic polymethacrylate-type or syndiotactic polyacrylate-type spiral macromolecular compound that is controlled in the direction of winding.

The present invention also relates to a syndiotactic polymethacrylate-type or syndiotactic polyacrylate-type spiral macromolecular compound that is controlled in the direction of winding of the spiral structure, and a stereocomplex formed from an isotactic polymethacrylate or isotactic polyacrylate, and a process for producing the same.

The present invention may be described in more detail, as follows.

(1) A process for producing a syndiotactic polymethacrylate-type or syndiotactic polyacrylate-type polymer spiral macromolecular compound that is controlled in the direction of winding of the spiral structure, the process including dissolving a syndiotactic polymethacrylate-type or syndiotactic polyacrylate-type polymer and a chiral compound in a solvent, subsequently subjecting the obtained solution to cooling or concentration to generate a solid matter, and separating the generated solid matter.

(2) The process according to (1) above, wherein the syndiotactic polymethacrylate-type or syndiotactic polyacrylate-type polymer has a molecular weight of 1,000 to 10,000,000.

(3) The process according to (1) or (2) above, wherein the syndiotactic polymethacrylate-type or syndiotactic polyacrylate-type polymer is syndiotactic polymethyl methacrylate.

(4) The process according to any one of (1) to (3) above, wherein the solid matter generated by cooling or concentration is a gelation product or a crystallization product.

(5) The process according to any one of (1) to (4) above, wherein the syndiotactic polymethacrylate-type or syndiotactic polyacrylate-type polymer is added to a solution having the chiral compound dissolved therein, subsequently this mixture is dissolved by heating, and then this solution is cooled or concentrated to gel.

(6) The process according to any one of (1) to (5) above, further including washing the generated solid matter to remove the chiral compound.

(7) The process according to any one of (1) to (6) above, wherein the chiral compound is a chiral compound represented by the following formula (1):

(wherein Ar represents an aryl group which may have a substituent, or an aralkyl group which may have a substituent; $R^1$ represents a hydrogen atom, an alkyl group which may have a substituent, an aryl group which may have a substituent, or an aralkyl group which may have a substituent; $R^2$ represents an alkyl group which may have a substituent, an aryl group which may have a substituent, or an aralkyl group which may have a substituent; Z represents a hydroxyl group, an amino group, a carboxyl group, a halogen atom, or a sulfonic acid group; and C* represents that the relevant carbon atom is an asymmetric carbon atom).

(8) The process according to (7) above, wherein the chiral compound is optically active 1-phenylethanol or 1-phenylethylamine.

(9) The process according to any one of (1) to (8) above, wherein the solvent is at least one selected from the group consisting of toluene, 1,2-dichlorobenzene, chlorobenzene, bromobenzene, benzene, butyl acetate and dimethylformamide.

(10) The process according to any one of (1) to (9) above, wherein the concentration of the syndiotactic polymethacrylate-type or syndiotactic polyacrylate-type polymer is $1 \times 10^{-7}$ g/mL to 5 g/mL.

(11) A process for producing a host-guest compound having a guest molecule included in the interior of the spiral structure of a syndiotactic polymethacrylate-type or syndiotactic polyacrylate-type polymer spiral macromolecular compound that is controlled in the direction of winding of the spiral structure, the process including further adding a guest compound during the process according to any one of (1) to (10) above, and thereby introducing the guest compound into the spiral structure.

(12) The process according to (11) above, wherein the adding a guest compound is carried out before the cooling or concentration.

(13) The process according to (11) above, wherein the adding a guest compound is carried out after the cooling or concentration.

(14) The process according to any one of (11) to (13) above, wherein the guest molecule is fullerene.

(15) A process for controlling the direction of winding of the spiral structure of a syndiotactic polymethacrylate-type or syndiotactic polyacrylate-type spiral macromolecular compound, the process including incorporating a chiral compound to be co-present with a syndiotactic polymethacrylate-type or syndiotactic polyacrylate-type polymer in a solvent, and thereby controlling the direction of winding of the spiral structure of the syndiotactic polymethacrylate-type or syndiotactic polyacrylate-type spiral macromolecular compound, in accordance with the chirality of the chiral compound.

(16) The process according to (15) above, wherein the syndiotactic polymethacrylate-type or syndiotactic polyacrylate-type polymer is added to a solution having the chiral compound dissolved therein.

(17) The process according to (15) above, wherein the chiral compound is added to a solution containing the syndiotactic polymethacrylate-type or syndiotactic polyacrylate-type polymer.

(18) The process according to any one of (15) to (17) above, wherein the process is carried out in the further presence of a guest compound.

(19) The process according to (18) above, wherein the guest compound is fullerene.

(20) A syndiotactic polymethacrylate-type or syndiotactic polyacrylate-type spiral macromolecular compound that is controlled in the direction of winding of the spiral structure.

(21) A syndiotactic polymethacrylate-type or syndiotactic polyacrylate-type spiral macromolecular compound that is controlled in the direction of winding, which has a structure wound one-sidedly in either the clockwise direction or the anticlockwise direction.

(22) The syndiotactic polymethacrylate-type or syndiotactic polyacrylate-type spiral macromolecular compound that is controlled in the direction of winding of the spiral structure according to (20) or (21) above, which is producible by the process according to any one of (1) to (10) above.

(23) The spiral macromolecular compound according to any one of (20) to (22) above, wherein the syndiotactic polymethacrylate-type polymer is syndiotactic polymethyl methacrylate.

(24) A host-guest compound having a guest molecule included in the interior of the spiral structure of a syndiotactic polymethacrylate-type or syndiotactic polyacrylate-type spiral macromolecular compound that is controlled in the direction of winding of the spiral structure.

(25) The host-guest compound according to (24) above, having a guest molecule included in the interior of the spiral structure of a syndiotactic polymethacrylate-type or syndiotactic polyacrylate-type spiral macromolecular compound that is controlled in the direction of winding of the spiral structure, the compound being producible by the process according to any one of (11) to (14) above.

(26) The host-guest compound according to (25) above, wherein the guest compound is fullerene.

(27) The host-guest compound according to any one of (24) to (26) above, wherein the syndiotactic polymethacrylate-type polymer is syndiotactic polymethyl methacrylate.

(28) A stereocomplex formed from a syndiotactic polymethacrylate-type or syndiotactic polyacrylate-type spiral macromolecular compound that is controlled in the direction of winding of the spiral structure, and an isotactic polymethacrylate or isotactic polyacrylate.

(29) The stereocomplex according to (26) above, wherein the syndiotactic polymethacrylate-type or syndiotactic polyacrylate-type spiral macromolecular compound that is controlled in the direction of winding of the spiral structure, has a structure wound one-sidedly in either the clockwise direction or the anticlockwise direction.

(30) The stereocomplex according to (28) or (29) above, wherein the syndiotactic polymethacrylate-type or syndiotactic polyacrylate-type spiral macromolecular compound that is controlled in the direction of winding of the spiral structure, is a syndiotactic polymethacrylate-type or syndiotactic polyacrylate-type spiral macromolecular compound that is controlled in the direction of winding, which is producible by the process according to any one of (1) to (10) above.

(31) The stereocomplex according to any one of (28) to (30) above, formed from a syndiotactic polymethacrylate-type spiral macromolecular compound that is controlled in the direction of winding of the spiral structure, and an isotactic polymethacrylate.

(32) The stereocomplex according to (31) above, wherein the syndiotactic polymethacrylate-type polymer is syndiotactic polymethyl methacrylate, and the isotactic polymethacrylate is isotactic polymethyl methacrylate.

(33) A process for producing a stereocomplex of a syndiotactic polymethacrylate-type or syndiotactic polyacrylate-type polymer spiral macromolecular compound that is controlled in the direction of winding of the spiral structure, and an isotactic polymethacrylate polymer, the process including mixing a syndiotactic polymethacrylate-type or syndiotactic polyacrylate-type polymer spiral macromolecular compound that is controlled in the direction of winding of the spiral structure, and a solution of an isotactic polymethacrylate, and stirring the mixture.

(34) The process according to (33) above, wherein the solvent is toluene.

Effects of the Invention

The present invention can provide a process for conveniently producing a spiral macromolecule having any desired direction of winding, from a syndiotactic polyacrylic acid ester or syndiotactic polymethacrylic acid ester, which is an inexpensive general-purpose macromolecule. Since various guest molecules such as fullerene can be included in the space inside the spiral of such a syndiotactic structure, the included guest molecules can be brought under a chiral environment. The chiral macromolecular materials obtained by bringing various guest compounds under a chiral environment, can be used in a wide variety of chiral materials, such as in sensors for chemical recognition, chiral catalysts, column materials that is chiral, and high density recording devices. Furthermore, the macromolecule obtainable by the present invention is considered to constitute the foundation for creation of a new material, which should be called a molecular element having a spiral structure.

According to the processes of the present invention, such a molecular element having a spiral structure can be produced conveniently and inexpensively without large-scale production facilities, adopting the mode of winding of spiral in a selective manner.

BRIEF DESCRIPTION OF THE DRAWINGS

FIG. 1 shows measured VCD and IR spectra of a st-PMMA gel of the present invention along with calculated VCD and IR spectra of spiral st-PMMA;

FIG. 2 shows CD and UV-vis spectra of st-PMMA/C60 inclusion complex gel of the present invention;

FIG. 3 shows changes in $^1$H-NMR spectrum occurring before and after toluene washing of the st-PMMA gel of the present invention;

FIG. 4 shows measured VCD and IR spectra of st-PMMA/C60 complex gel of the present invention prepared in one step along with calculated VCD and IR spectra of spiral st-PMMA;

FIG. 5 shows CD and UV-vis spectra of the st-PMMA/C60 inclusion complex gel of the present invention prepared in one step;

FIG. 6 shows VCD and IR spectra of a stereocomplex gel formed from a macromolecular inclusion complex composed of fullerene and the syndiotactic polymethyl methacrylate that is controlled in the direction of winding of the spiral structure of the present invention; and FIG. 7 shows VCD and IR spectra of a stereocomplex gel formed from the syndiotactic polymethyl methacrylate that is controlled in the direction of winding of the spiral structure of the present invention.

BEST MODE FOR CARRYING OUT THE INVENTION

The present invention is to provide a syndiotactic polymethacrylate-type or syndiotactic polyacrylate-type spiral macromolecular compound that is controlled in the direction of winding of the spiral structure. The inventors of the present invention have found that stable spiral structures can be obtained in the presence of a guest compound such as fullerene (see Patent Document 1), but it was not possible to control the direction of winding of the spiral structures. These spiral structures were present as mixtures of clockwise spirals and anticlockwise spirals, but methods for separating these had not been developed yet, and any structure that was controlled in the direction of winding of the spiral structure could not be isolated. In other words, the present invention provides for the first time a syndiotactic polymethacrylate-type or syndiotactic polyacrylate-type spiral macromolecular compound that has a stable spiral structure and has the spiral structure controlled into a structure wound one-sidedly in either the clockwise direction or the anticlockwise direction.

In order to precisely control the direction of winding of spiral, it is most efficient to treat the polymer in a solution state. In that case, the treatment is achieved using a solution having a syndiotactic polymethacrylate-type or syndiotactic polyacrylate-type polymer and a small amount of a chiral compound dissolved in a solvent. The small amount of chiral compound may be added together with the polymer, or may be added after the polymer has been completely dissolved; however, the addition is preferably carried out before entering to a temperature-lowering process, and necessarily before the formation of the spiral structure of the polymer starts.

According to the present invention, the ester in the syndiotactic polymethacrylate-type polymer or the syndiotactic polyacrylate-type polymer (hereinafter, may be collectively referred to as st-PMMAs) may be a linear or branched alkyl group having 1 to 30, preferably 1 to 20, 1 to 10, or 1 to 5, carbon atoms. Such an alkyl group may be substituted with a commonly used substituent, such as an alkoxy group or halogen. In regard to the stereoregularity of the macromolecule, a macromolecule having a syndiotactic triad content (rr content) of 60% or more is preferably used. With higher syndiotacticity, it is easier for the polymer to adopt a spiral structure, and the amount of the guest compound to be introduced, such as fullerene, increases, thus it being preferable. More preferably, the rr content is 80% or more, even more preferably 90% or more, and most preferably 93% or more.

Within the scope of not impairing the effects of the present invention, a copolymer may also be used, and the copolymer may be a random, block or graft copolymer in terms of structure. It is also acceptable to use a blend of two or more types of polymers.

The polymer molecular weight (degree of polymerization) of the st-PMMAs of the present invention is not limited, but it is required that the polymer dissolves in a solvent. Usually, polymers having a number average molecular weight of 10,000,000 or smaller are used, and polymers having a number average molecular weight of 10 to 10,000,000, preferably 1000 to 10,000,000, and more preferably 1000 to 1,000,000, are preferable from the viewpoints of dissolubility and versatility.

The polymer of the present invention needs to be substantially syndiotactic, but other polymers may also be present together. For example, it is known that st-PMMAs and isotactic polymethyl methacrylate (hereinafter, may be abbreviated to it-PMMA) form a macromolecular complex called stereocomplex (hereinafter, may be abbreviated to SC) in toluene (see Spevacek, J., Schneider, B., Adv. Colloid. Interface Sci., 1987, 27, 81), and through this formation of SC, remarkable enhancement in thermal resistance is observed, such as that the complex acquires a high melting point, without exhibiting the glass transition points observed with single polymers. The present invention is also achieved through the use of this SC (see Examples 4 and 5 below).

Therefore, the present invention provides a process for producing a stereocomplex of a syndiotactic polymethacrylate-type or syndiotactic polyacrylate-type polymer spiral macromolecular compound that is controlled in the direction of winding of the spiral structure, and an isotactic polymethacrylate polymer, by adding and dissolving a syndiotactic polymethacrylate-type or syndiotactic polyacrylate-type polymer in a solution containing a chiral compound dissolved therein, and then generating a solid matter such as a gelation product or a crystallization product through cooling, concentration or the like, to thereby produce a syndiotactic polymethacrylate-type or syndiotactic polyacrylate-type polymer spiral macromolecular compound that is controlled in the direction of winding of the spiral structure, and subsequently adding thereto an isotactic polymethacrylate polymer.

Furthermore, in the process described above, a guest compound that will be described later may also be added.

The solvent according to the present invention is not particularly limited as long as it can dissolve the syndiotactic polymethacrylate-type polymer or syndiotactic polyacrylate-type polymer, and the chiral compound, but usually a nonpolar organic solvent is preferred.

Preferable solvents include at least one selected from the group consisting of toluene, 1,2-dichlorobenzene, chlorobenzene, bromobenzene, benzene, butyl acetate and dimethylformamide. These solvents may be used individually, or may be used as mixtures of two or more species. The ratio of mixing may be arbitrarily selected in accordance with the type and reactive group of the polymer, and other conditions. A particularly preferable solvent may be toluene.

The dissolution temperature for dissolving the syndiotactic polymethacrylate-type polymer, the syndiotactic polyacrylate-type polymer or the chiral compound, is not particularly limited, and any temperature higher than or equal to the melting point and lower than or equal to the boiling point of the solvent can be used. However, the temperature is preferably 50° C. or above from the viewpoint of the relationship between the solubility and the rate of dissolution, and may be more preferably about 50 to 120° C., 70 to 120° C., or 70 to 110° C.; however, a higher temperature is more preferable as long as it is lower than or equal to the boiling point.

There is no limit on the concentration of the polymer in the solvent, as long as the concentration is lower than or equal to the solubility. A high concentration close to the solubility poses a risk in homogeneity, while an excessively low concentration is not efficient. The concentration of the polymer of the present invention is preferably in the range of $1 \times 10^{-7}$ g/mL to 5 g/mL, more preferably 1 to 1000 mg/mL, 10 to 500 mg/mL, or 50 to 300 mg/mL.

The chiral compound according to the present invention is not particularly limited, as long as the compound can be dissolved in the solvent that is capable of dissolving the syndiotactic polymethacrylate-type polymer or syndiotactic polyacrylate-type polymer, has one or more asymmetric sites, and at least a part of the compound can enter into the space surrounding the syndiotactic structure. Such asymmetry may be asymmetry due to asymmetric carbon atoms, or may also be molecular asymmetry due to hindered rotation, or the like.

A preferable chiral compound according to the present invention may be a compound having an aryl group, and there may be mentioned a chiral compound represented by the following formula (1):

$$\text{Ar}—\text{C*}(R^1)(R^2)—Z \qquad (1)$$

(wherein Ar represents an aryl group which may have a substituent, or an aralkyl group which may have a substituent; $R^1$ represents a hydrogen atom, an alkyl group which may have a substituent, an aryl group which may have a substituent, or an aralkyl group which may have a substituent; $R^2$ represents an alkyl group which may have a substituent, an aryl group which may have a substituent, or an aralkyl group which may have a substituent; Z represents a hydroxyl group, an amino group, a carboxyl group, a halogen atom, or a sulfonic acid group; and C* represents that the relevant carbon atom is an asymmetric carbon atom).

The aryl group as used in the formula (1) described above maybe a monocyclic, polycyclic or fused ring-type aryl group having 6 to 36 carbon atoms, and preferably 6 to 18 carbon atoms or 6 to 12 carbon atoms. Examples of such an aryl group include a phenyl group, a naphthyl group, a biphenyl group, a phenanthryl group, an anthryl group, and the like. A preferable aryl group may be a phenyl group.

The aralkyl group as used in the formula (1) described above may be an aralkyl group (carbocyclic aromatic aliphatic group) having 7 to 40 carbon atoms, and preferably 7 to 20 carbon atoms or 7 to 15 carbon atoms, in which an alkyl group having 1 to 20 carbon atoms is bound to a monocyclic, polycyclic or fused ring-type aryl group having 6 to 36 carbon atoms, and preferably 6 to 18 carbon atoms or 6 to 12 carbon atoms. Examples of such a substituent include a benzyl group, a phenethyl group, an α-naphthylmethyl group, and the like.

The alkyl group as used in the formula (1) described above maybe a linear or branched alkyl group having 1 to 20 carbon atoms, and preferably 1 to 15 carbon atoms or 1 to 10 carbon atoms, or a saturated or unsaturated, monocyclic, polycyclic or fused ring-type cycloalkyl group having 3 to 15 carbon atoms, and preferably 3 to 10 carbon atoms. Examples of such an alkyl group include a methyl group, an ethyl group, an n-propyl group, an isopropyl group, an n-butyl group, an isobutyl group, a sec-butyl group, a tert-butyl group, a pentyl group, a hexyl group, an octyl group, a cyclopentyl group, a cyclohexyl group, a cyclooctyl group, and the like.

These aryl group, aralkyl group and alkyl group may be substituted with substituents, and examples of such substituents include an alkyl group having 1 to 20 carbon atoms as mentioned above, an alkenyl group having 2 to 20 carbon atoms, an alicyclic hydrocarbon group having 3 to 15 carbon atoms, an alkylcarbonyl group having 2 to 21 carbon atoms, an alicyclic hydrocarbon-carbonyl group having 4 to 16 carbon atoms, an aralkylcarbonyl group having 8 to 41 carbon atoms, a halogen atom, a hydroxyl group, a nitro group, a carbocyclic aromatic group having 6 to 36 carbon atoms, a heterocyclic group having a 3- to 8-membered ring containing 1 to 4 heteroatoms selected from a nitrogen atom, an oxygen atom or a sulfur atom, an aralkyl group having 7 to 40 carbon atoms, an alkoxy group having 1 to 20 carbon atoms, an alkylcarbonyloxy group having 2 to 21 carbon atoms, a carbocyclic aromatic carbonyloxy group having 7 to 37 carbon atoms, an aralkylcarbonyloxy group having 8 to 41 carbon atoms, an alkoxycarbonyl group having 2 to 21 carbon atoms, a carbocyclic aromatic oxycarbonyl group having 7 to 37 carbon atoms, an aralkyloxycarbonyl group having 8 to 41 carbon atoms, a substituted or unsubstituted amino group, an alkylsilyl group, and the like.

The group Z as used in the formula (1) described above is preferably a functional group of various types, and such a functional group may be a hydroxyl group, an amino group, a carboxyl group, a halogen atom, a sulfonic acid group, or the like. These functional groups may be substituted with the above-mentioned alkyl group, aryl group or the like. For example, the hydroxyl group may be in the form of an alkoxy group, and the amino group may be in the form of a monoalkylamino group, a dialkylamino group, a monoacylated amino group, or the like. Also, the carboxyl group or the sulfonic acid group may form a salt, and may also form an ester. The halogen atom may be a chlorine atom, a bromine atom, or the like.

As a preferable chiral compound represented by the formula (1), there may be mentioned a compound in which Ar is a phenyl group, $R^1$ is a hydrogen atom, $R^2$ is an alkyl group, and preferably a methyl group, and Z is a hydroxyl group or an amino group. More specifically, 1-phenylethanol, 1-phenylethylamine or the like may be mentioned.

For these chiral compounds, those having high optical purity are preferred, but the optical purity may not be necessarily 100%. If the optical purity is lowered, the direction of winding of the spiral in the resulting spiral structure is also made such that clockwise-wound compounds and anticlockwise-wound compounds co-exist. Thus, in order to prevent such co-existence of different directions of winding, a compound having higher optical purity is preferred.

Since the chiral compound of the present invention can be recovered after having controlled the spiral structure, the chiral compound can be used in any arbitrary amount, but a preferable amount may be about 5 to 100% by volume, and more preferably 10 to 50% by volume, or 10 to 30% by volume, with respect to the solvent used.

In regard to the process of the present invention, first a solution containing the polymer and the chiral compound of the present invention is prepared by the process described above. In this case, the chiral compound may be added together with the polymer, or may be added after the polymer has been dissolved. However, the chiral compound is preferably added before proceeding to a temperature lowering process, and necessarily before the formation of the spiral structure of the polymer is initiated. Preparation of the solution is carried out such that the system is dissolved by heating up to the temperature mentioned above, preferably while stirring is performed.

Subsequently, when the obtained solution is left to cool or concentrated, a solid matter, that is, solid components such as a gelation product or a crystallization product, is generated, and crystals are precipitated. The temperature may be acceptable at room temperature, but depending on the concentration, lower temperature or higher temperature can also be used. Optionally, the solution may also be concentrated.

In the separation of the gelation product or crystals precipitated as such, techniques that are already known, such as filtration, decantation, and centrifugation, can be used. Furthermore, if the solvent is used in a small amount, in some cases, the solid matter containing a small amount of the solvent may be directly separated as the solid matter of the present invention. The solid matter of the present invention, such as the separated gelation product or crystals, can be removed of the chiral compound used for controlling the direction of winding, by washing with the solvent used in the dissolution, such as toluene, or another solvent, and thereby can be recovered. In general, washing and recovery are carried out simultaneously.

As such, the direction of winding of the spiral structure of the syndiotactic polymethacrylate-type polymer or syndiotactic polyacrylate-type polymer can be controlled in accordance with the chirality of the chiral compound, by means of a convenient technique of incorporating a chiral compound to be co-present with the polymer. For example, in the case of using an (R)-form chiral compound, the st-PMMA chain adopts a spiral structure that is wound clockwise, and in the case of using an (S)-form chiral compound, the st-PMMA chain adopts a spiral structure that is wound anticlockwise.

Here, the control of the spiral structure that has been described thus far represents the most efficient process for production in a solution system; however, the spiral structure may also be controlled by contacting the syndiotactic polymethacrylate-type or syndiotactic polyacrylate-type polymer with the chiral compound in the solid state.

Furthermore, as to whether the direction of winding of the spiral has been controlled, observation can be made by measuring the circular dichroism (CD) if the polymer exhibits absorption in the ultraviolet-visible region. If the polymer does not exhibit absorption in the ultraviolet-visible region, it can be determined by measuring the circular dichroism of infrared absorption (VCD). If the direction of winding of the spiral has not been controlled, such chiral absorption circular dichroism is not observed. However, if control is achieved such that any between the clockwise direction and the anticlockwise direction is dominant, absorption is observed.

Therefore, the present invention provides a process for producing a spiral macromolecular compound in which the spiral structure of a syndiotactic polymethacrylate-type polymer or syndiotactic polyacrylate-type polymer is controlled, by using such a chiral compound, and also provides a process for controlling the spiral structure. The present invention also provides a spiral macromolecular compound in which the spiral structure of a syndiotactic polymethacrylate-type polymer or syndiotactic polyacrylate-type polymer is controlled, which compound is produced by these processes.

The present invention relates not only to the spiral macromolecular compound in which the spiral structure of the syndiotactic polymethacrylate-type polymer or syndiotactic polyacrylate-type polymer is controlled as described above, but also to a host-guest compound having a guest compound included in the interior of such a spiral structure.

The process for producing the host-guest compound of the present invention can be carried out by adding a guest compound in any step in the process for production of the previously mentioned spiral macromolecular compound that is controlled in the spiral structure. For example, the guest compound may be added after the polymer is gelled to obtain a gelation product or crystals, or the guest compound may be added into the solution containing the chiral compound. After adding the guest compound as such, the system is subjected to the same process as described above, and thereby the host-guest compound of the present invention can be produced.

The guest compound according to the present invention is not particularly limited as long as it is a substance that can be introduced into the interior of the spiral structure. A preferable guest compound according to the present invention may be fullerene. Fullerene has strong cohesive power, and in general, if fullerene and a macromolecule are simply mixed, fullerene undergoes phase separation in the macromolecule and forms irregularly shaped aggregates. Thus, it is difficult to incorporate fullerene at high concentrations, and the excellent electrical, optical and magnetic properties of fullerene cannot be maximally utilized. Therefore, when fullerene is introduced into the interior of the spiral structure of the present invention, it becomes possible to disperse fullerene uniformly and to utilize the functions of fullerene effectively.

The fullerene as used in the present invention may be of any type, as long as it belongs to the class commonly called fullerenes, and examples include C60 fullerene, C70 fullerene, C74 fullerene, C76 fullerene, C78 fullerene, C82 fullerene, and the like. These fullerenes may be chemically modified fullerenes, surface-treated fullerenes, or fullerenes having a gas or metal encapsulated inside the fullerene. The present invention also includes the use of these fullerenes applied with treatments, fullerenes with encapsulated metal or the like, and higher-order fullerenes. Fullerenes having an inert gas such as helium or argon or a metal atom such as lithium or calcium encapsulated therein, are known as fullerenes that are excellent in the optical properties and/or electrical properties. Thus, it is preferable to use such a fullerene having an inert gas or a metal atom encapsulated therein.

As a technique of increasing the amount of inclusion of fullerene upon using a fullerene as the guest compound, use can be made of a process of combining a solvent having high solubility for fullerene and a solvent having high solubility for a polymer, to dissolve the fullerene and the polymer respectively in those different solvents, subsequently mixing the two solutions, and then removing the solvents. For example, a fullerene-macromolecule complex containing fullerene at high concentration can be obtained by respectively dissolving the fullerene in dichlorobenzene, which has high solubility for fullerene, and the polymer in toluene, which has high solubility for the polymer, and then mixing the two solutions. The volume ratio of dichlorobenzene and toluene in this case is such that the ratio of dichlorobenzene:toluene is preferably 5/95 to 85/15, and more preferably 10/90 to 55/45.

The fullerene-containing host-guest compound of the present invention thus obtained can be obtained as a crystalline complex, and thus this compound can be separated from the solvent by centrifugation, filtration or the like. The solvent may also be separated by distilling off the solvent, but since unincluded fullerene may be mixed into the solvent in this case, it is preferable to further purify the product according to necessity.

The fullerene-containing host-guest compound of the present invention has a melting point that is different from the respective melting points of the raw material fullerene and macromolecule as simple substances, and also differs in the crystal structure. Therefore, generation of the host-guest compound can be easily confirmed by various analysis techniques. For example, confirmation can be made by measurement of the melting point by differential scanning calorimetry (DSC), analysis of crystal structure by X-ray diffraction, observation of the crystal phase under a polarized microscope, observation of the crystal surface under an atomic force microscope (AFM), or the like.

The fullerene-containing host-guest compound of the present invention can be molded into a membranous form (film form) or the like, in a similar manner as in the case of ordinary macromolecular materials. It is also possible to form a monomolecular film (Langmuir-Blodgett film, LB film).

Since the fullerene-containing host-guest compound of the present invention contains functional fullerene, and maintains the direction of winding of the spiral structure constant, the host-guest compound can be applied as a macromolecular material capable of manifesting the functions of the fullerene, such as optical properties or electrical properties. For example, the host-guest compound can be used as industrial products such as a photoelectric conversion element, a resist material and a quantum dot element.

Moreover, the present invention also provides a stereocomplex formed from a syndiotactic polymethacrylate-type or syndiotactic polyacrylate-type spiral macromolecular compound that is controlled in the direction of winding of the spiral structure, and an isotactic polymethacrylate or isotactic polyacrylate. Preferably, the present invention provides a stereocomplex formed from a syndiotactic polymethacrylate-type or syndiotactic polyacrylate-type spiral macromolecular compound that is controlled in the direction of winding of the spiral structure, and an isotactic polymethacrylate.

The ester of the isotactic polymethacrylate or isotactic polyacrylate, preferably isotactic polymethacrylate, in the stereocomplex of the present invention may use a linear or branched alkyl group having 1 to 30, and preferably 1 to 20, 1 to 10, or 1 to 5, carbon atoms. Such an alkyl group may be substituted with a commonly used substituent such as an alkoxy group or halogen. The most preferable ester is methyl ester. In regard to the stereoregularity of the macromolecule, a macromolecule having an isotactic triad content (mm content) of 60% or more is preferably used. More preferably, the mm content is 80% or more, even more preferably 90% or more, and most preferably 93% or more.

Within the scope of not impairing the effects of the present invention, a copolymer may also be used, and the copolymer may be a random, block or graft copolymer in terms of structure. It is also acceptable to use a blend of two or more types of polymers.

The molecular weight (degree of polymerization) of the isotactic polymethacrylate of the present invention is not limited, but it is required that the polymer dissolves in a solvent. Usually, polymers having a number average molecular weight of 10,000,000 or less are used, and polymers having a number average molecular weight of 10 to 10,000,000, preferably 1000 to 10,000,000, and more preferably 1000 to 1,000,000, are preferable from the viewpoints of dissolubility and versatility.

The stereocomplex of the present invention can be produced by mixing and stirring a syndiotactic polymethacrylate-type or syndiotactic polyacrylate-type polymer spiral macromolecular compound of the present invention that is controlled in the direction of winding of the spiral structure, and a solution of an isotactic polymethacrylate or isotactic polyacrylate, preferably an isotactic polymethacrylate. The syndiotactic polymethacrylate-type or syndiotactic polyacrylate-type polymer spiral macromolecular compound that is controlled in the direction of winding of the spiral structure, which will be used as a raw material, maybe the compound itself, or may be a host-guest compound having fullerene or the like introduced therein.

The stereocomplex can be obtained by mixing and stirring the solutions, and then allowing the mixture to stand. When this resultant is washed with a solvent as necessary, any excess raw material compound or guest compound can be removed.

The solvent that is used for this process may be at least one selected from the group consisting of toluene, 1,2-dichlorobenzene, chlorobenzene, bromobenzene, benzene, butyl acetate and dimethylformamide. These solvents may be used individually, or may be used as mixtures of two or more species. The ratio of mixing may be arbitrarily selected in accordance with the type and reactive group of the polymer, and other conditions. A particularly preferable solvent may be toluene.

Hereinafter, the present invention will be described with reference to the following specific examples so as to make the present invention easier to understand, but the present invention is not intended to be limited these specific examples.

EXAMPLE 1

Production of Syndiotactic polymethyl methacrylate Having Unidirectionally Wound Spiral Structure Formed by 1-phenylethanol in Toluene Solvent (1) 0.5 mL of a solution prepared by mixing (R)-1-phenylethanol as a chiral compound into toluene at a ratio of 9:1 (volume fraction), was prepared. 20 mg of st-PMMA (number average molecular weight 460,000, syndiotactic triad content (rr content) 93.5%) was added to the solution, and the mixture was heated to 110° C. to obtain a uniform solution.

As the resulting solution was allowed to stand at room temperature, the solution gelled after 3 hours. The obtained gel was washed with toluene to remove the chiral compound, (R)-1-phenylethanol. The fact that (R)-1-phenylethanol could be removed, was confirmed by the $^1$H-NMR (Unity Inova 500 manufactured by Variant) spectra obtained before and after washing with toluene, as will be shown in Example 3 that will be described later.

(2) A gel was obtained in the same manner as in (1) above, except that (S)-1-phenylethanol was used instead of the (R)-1-phenylethanol used in (1) above as the chiral compound.

(3) A gel was obtained in the same manner as in (1) above, except that racemic 1-phenylethanol was used instead of the (R)-1-phenylethanol used in (1) above as the chiral compound.

(4) The infrared circular dichroism (VCD, JV-2001 manufactured by JASCO) spectrum and the IR spectrum of each of the gels obtained in (1), (2) and (3) above, are presented in FIG. 1. The horizontal axis in FIG. 1 represents the wave number ($cm^{-1}$), and the vertical axis represents the absorbance difference ($\times 10^5$). In FIG. 1, (a) represents the case of using racemic 1-phenylethanol in (3) above, (b) represents the case of using (R)-1-phenylethanol in (1) above, and (c) represents the case of using (S)-1-phenylethanol in (2) above. In the lower part of FIG. 1, (d) and (e) represent the calculated values of the VCD spectra calculated theoretically based on the spiral structure of st-PMMA, and (d) represents the theoretical calculated values for clockwise winding, while (e) represents the theoretical calculated values for anticlockwise winding.

As a result, in regard to the gels ((b) and (c) in FIG. 1) obtained using the (R)-form 1-phenylethanol and the (S)-form 1-phenylethanol, respectively, induced circular dichroism (ICD) of st-PMMA in the infrared absorption region could be observed, and thus it was judged that the gels were in a mirror image relationship with each other. However, the gel obtained from racemic 1-phenylethanol ((a) of FIG. 1) did not exhibit ICD.

Furthermore, predictive spectra obtained from theoretical calculations in quantum mechanics (Gaussian 03) of the 18/1 spiral of st-PMMA, are respectively presented in (d) and (e) of FIG. 1. Since these spectra are highly consistent with the actually measured spectra ((b) and (c) of FIG. 1), it could be confirmed that the st-PMMA spiral structure in the gels obtained from (R)-form and (S)-form 1-phenylethanol were wound unidirectionally. Also, as found from a comparison with the calculated spectra, the st-PMMA chain in the gel obtained from the (R)-form 1-phenylethanol is wound clockwise, and the st-PMMA chain obtained from the (S)-form is wound anticlockwise.

EXAMPLE 2

Production of Macromolecular Inclusion Complex (Host-Guest Compound) Composed of Syndiotactic polymethyl methacrylate Having Unidirectionally Wound Spiral Structure and Fullerene (1) To 0.5 mL of a solution prepared by mixing (R)-1-phenylethanol as a chiral compound into toluene at a ratio of 9:1 (volume fraction), 20 mg of st-PMMA (number average molecular weight 460,000, syndiotactic triad content (rr content) 93.5%) was added, and the mixture was heated to 110° C. to obtain a uniform solution. As this solution was allowed to stand at room temperature, the solution gelled after 3 hours. The obtained gel was washed with toluene to remove the chiral compound. It was confirmed by $^1$H-NMR that the chiral compound had been removed, similarly to the case of Example 3 that will be described later.

1 mL of a solution of fullerene C60 in toluene (2 mg/mL) was added to the obtained gel, and the mixture was stirred for 10 minutes. When the gel was precipitated by centrifugation, the gel part was colored dark violet, and thus it could be seen that C60 had been introduced into the gel. The gel was washed again with toluene, and thus a unidirectionally wound st-PMMA/C60 inclusion complex gel was obtained.

(2) A gel was obtained in the same manner as in (1) above, except that (S)-1-phenylethanol was used instead of the (R)-1-phenylethanol used in (1) above as the chiral compound.

(3) A gel was obtained in the same manner as in (1) above, except that racemic 1-phenylethanol was used instead of the (R)-1-phenylethanol used in (1) above as the chiral compound.

(4) The circular dichroism (CD) spectrum in the ultraviolet-visible region of each of the gels obtained in (1), (2) and (3) above, are presented in FIG. 2. The horizontal axis in FIG. 2 represents the wavelength (nm), and the vertical axis represents the molar circular dichroism ($M^{-1}$ $cm^{-1}$). In FIG. 2, (a) represents the case of using racemic 1-phenylethanol in (3) above, (b) represents the case of using (R)-1-phenylethanol in (1) above, and (c) represents the case of using (S)-1-phenylethanol in (2) above. The lower part of FIG. 2 shows the results of UV spectroscopy. The absorbance is shown against the scale on the right-hand side.

As a result, in the gels which used the (R)-form and (S)-form 1-phenylethanol, ICD was observed in the absorption region of C60 ((b) and (c) of FIG. 2). Because C60 is an achiral molecule, it is thought that since the st-PMMA adopts a spiral structure that is wound dominantly in one direction, the observed ICD is the result of the C60 brought under the effect of perturbation of the spiral structure of the st-PMMA (see Yoshida, Z., Takekuma, H., et al., Angew. Chem. Int. Ed. Engl., 1994, 33, 1597).

It was confirmed that the guest molecule C60 can be placed under a chiral environment by inclusion into unidirectionally wound st-PMMA.

EXAMPLE 3

Production of Macromolecular Inclusion Complex (Host-Guest Compound) Composed of Syndiotactic polymethyl methacrylate Having Unidirectionally Wound Spiral Structure and Fullerene in One Step (1) To 0.5 mL of a solution prepared by mixing a toluene solution of fullerene C60 (fullerene concentration 2 mg/mL) and (R)-1-phenylethanol as a chiral compound at a ratio of 8:2 (volume fraction), 20 mg of st-PMMA (number average molecular weight 460,000, syndiotactic triad content (rr content) 93.5%) was added, and the mixture was heated to 110° C. to obtain a uniform solution. As the resulting solution was allowed to stand at room temperature, the solution gelled after 15 hours. The obtained gel was washed with toluene to remove the (R)-1-phenylethanol. The $^1$H-NMR (Unity Inova 500 manufactured by Variant) spectra obtained before and after washing with toluene are presented in FIG. 3. In FIG. 3, (a) in the upper row represents the spectrum obtained before washing, and (b) in the lower row represents the spectrum obtained after washing.

As a result, it was confirmed that the peak due to the benzyl proton of 1-phenylethanol at about 4.85 ppm disappeared. Thus, it was confirmed that (R)-1-phenylethanol had been removed.

When the gel was precipitated by centrifugation, the gel part was colored dark violet, and it could be seen that C60 had been introduced into the gel. By carrying out the operations described above, a unidirectionally wound st-PMMA/C60 inclusion complex gel was obtained.

(2) A gel was obtained in the same manner as in (1) above, except that (S)-1-phenylethanol was used instead of the (R)-1-phenylethanol used in (1) above as the chiral compound.

(3) A gel was obtained in the same manner as in (1) above, except that racemic 1-phenylethanol was used instead of the (R)-1-phenylethanol used in (1) above as the chiral compound.

(4) The infrared circular dichroism (VCD, JV-2001 manufactured by JASCO) spectrum and IR spectrum of each of the gels obtained in (1), (2) and (3) above are presented in FIG. 4. The horizontal axis in FIG. 4 represents the wave number ($cm^{-1}$), and the vertical axis represents the absorbance difference ($\times 10^5$). In FIG. 4, (a) represents the case of using racemic 1-phenylethanol in (3) above, (b) represents the case of using (R)-1-phenylethanol in (1) above, and (c) represents the case of using (S)-1-phenylethanol in (2) above. In the lower part of FIG. 4, (d) and (e) represent the calculated values of the VCD spectra calculated theoretically based on the spiral structure of st-PMMA, and (d) represents the theoretical calculated values for clockwise winding, while (e) represents the theoretical calculated values for anticlockwise winding.

As a result, in the measurement of VCD for the obtained gels, ICD was observed in the absorption region of st-PMMA for the gels obtained using the (R)-form and (S)-form 1-phenylethanol (see FIG. 4).

(5) The circular dichroism (CD) spectrum in the ultraviolet-visible region of each of the gels obtained in (1), (2) and (3) above, are presented in FIG. 5. The horizontal axis in FIG. 5 represents the wavelength (nm), and the vertical axis represents the molar circular dichroism ($M^{-1}$ $cm^{-1}$). In FIG. 5, (a) represents the case of using racemic 1-phenylethanol in (3) above, (b) represents the case of using (R)-1-phenylethanol in (1) above, and (c) represents the case of using (S)-1-phenylethanol in (2) above. The lower part of FIG. 5 shows the results of UV spectroscopy. The absorbance is shown against the scale on the right-hand side.

As a result, in the measurement of CD in the ultraviolet-visible region, ICD was observed in the absorption region of C60 (see FIG. 5). This result shows that a unidirectionally wound st-PMMA/C60 complex can be obtained in one step by performing the gelation of st-PMMA in the presence of C60 and the chiral compound 1-phenylethanol.

EXAMPLE 4

Production of Stereocomplex (SC) Composed of Syndiotactic polymethyl methacrylate Having Unidirectionally Wound Spiral Structure, Formed from Macromolecular Inclusion Complex Composed of Syndiotactic polymethyl methacrylate and Fullerene, and Isotactic polymethyl methacrylate (1) To 0.5 mL of a solution prepared by dissolving (R)-1-phenylethanol as a chiral compound in a toluene solution of fullerene C60 (fullerene concentration 2 mg/mL) at a ratio of 8:2 (volume fraction), 20 mg of st-PMMA (number average molecular weight 460,000, syndiotactic triad content (rr content) 93.5%) was added, and the mixture was heated to 110° C. to obtain a uniform solution. As the resulting solution was allowed to stand at room temperature, the solution gelled after 15 hours. The obtained gel was washed with toluene to remove (R)-1-phenylethanol.

1 mL of a toluene solution of it-PMMA (number average molecular weight 20,000, isotactic triad content (mm content) 96%) (20 mg/mL) was added to the obtained unidirectionally wound st-PMMA/C60 complex gel, and the mixture was stirred at room temperature. Concomitantly with the formation of a stereocomplex (SC), the C60 included in the st-PMMA was released. After 48 hours, the gel was washed with toluene, and thereby the released C60 and excess it-PMMA were removed. Thus, the title stereocomplex (SC) was obtained.

(2) A gel was obtained in the same manner as in (1) above, except that (S)-1-phenylethanol was used instead of the (R)-1-phenylethanol used in (1) above as the chiral compound.

(3) A gel was obtained in the same manner as in (1) above, except that racemic 1-phenylethanol was used instead of the (R)-1-phenylethanol used in (1) above as the chiral compound.

(4) The infrared circular dichroism (VCD, JV-2001 manufactured by JASCO) spectrum and IR spectrum of each of the gels obtained in (1), (2) and (3) above are presented in FIG. 6. The horizontal axis in FIG. 6 represents the wave number ($cm^{-1}$), and the vertical axis represents the absorbance difference ($\times 10^5$). In FIG. 6, (a) represents the case of using racemic 1-phenylethanol in (3) above, (b) represents the case of using (R)-1-phenylethanol in (1) above, and (c) represents the case of using (S)-1-phenylethanol in (2) above.

As a result, in the measurement of VCD of the gels produced using (R)-form and (S)-form 1-phenylethanol, it was found that ICD was observed in the absorption region of PMMA, and a stereocomplex having a unidirectionally wound spiral structure was obtained (see FIG. 6).

EXAMPLE 5

Production of Stereocomplex (SC) Composed of Syndiotactic polymethyl methacrylate Having Unidirectionally Wound Spiral Structure and Isotactic polymethyl methacrylate (1) To 0.5 mL of a solution prepared by dissolving (R)-1-phenylethanol as a chiral compound in toluene at a ratio of 9:1 (volume fraction), 20 mg of st-PMMA (number average molecular weight 460,000, syndiotactic triad content (rr content) 93.5%) was added, and the mixture was heated to 110° C. to obtain a uniform solution. As the resulting solution was allowed to stand at room temperature, the solution gelled after 3 hours. The obtained gel was washed with toluene to remove (R)-1-phenylethanol.

1 mL of a toluene solution of it-PMMA (number average molecular weight 20,000, isotactic triad content (mm content) 96%) (20 mg/mL) was added to the resulting unidirectionally wound st-PMMA gel, and the mixture was stirred at room temperature. After 48 hours, the gel was washed with toluene, and thereby excess it-PMMA was removed. Thus, the title stereocomplex (SC) was obtained.

(2) A gel was obtained in the same manner as in (1) above, except that (S)-1-phenylethanol was used instead of the (R)-1-phenylethanol used in (1) above as the chiral compound.

(3) The infrared circular dichroism (VCD, JV-2001 manufactured by JASCO) spectrum and the IR spectrum of each of the gels obtained in (1) and (2) above, are presented in FIG. 7. The horizontal axis in FIG. 7 represents the wave number ($cm^{-1}$), and the vertical axis represents the absorbance difference ($\times 10^5$). In FIG. 7, (a) represents the case of using (R)-1-phenylethanol in (1) above, and (b) represents the case of using (S)-1-phenylethanol in (2) above.

As a result, in the measurement of VCD of the gels produced using the (R)-form and (S)-form 1-phenylethanol, ICD was observed in the absorption region of PMMA, and thus it was found that a stereocomplex having a unidirectionally wound spiral structure is obtained (see FIG. 7).

Industrial Applicability

The present invention provides a process for conveniently and selectively producing st-PMMAs in which the direction of winding of the spiral structure is constant. The st-PMMAs of the present invention in which the direction of winding of the spiral structure is constant, can be used as a chiral material in a wide variety of applications such as a sensor for chemical recognition, a chiral catalyst, a column material that is chiral, and a high density recording device. Furthermore, when a guest compound is included in these st-PMMAs, the chirality of the guest compound can also be utilized. Thus, the present invention has industrial applicability in the field of chemistry as well as in extensive fields of materials.

The invention claimed is:

1. A syndiotactic polymethacrylate or syndiotactic polyacrylate spiral macromolecular compound that is controlled in the direction of winding of the spiral structure, wherein a syndiotactic triad content (rr content) is 80% or more.

2. The spiral macromolecular compound according to claim 1, wherein the syndiotactic polymethacrylate polymer is syndiotactic polymethyl methacrylate.

3. The spiral macromolecular compound according to claim 1 produced by the process comprising:

dissolving in a solvent a syndiotactic polymethacrylate or syndiotactic polyacrylate polymer of which a syndiotactic triad content (rr content) is 80% or more and a chiral compound in an amount 10% or more by volume with respect to said solvent; and subsequently subjecting the obtained solution to cooling or concentration to form a solid matter.

4. The spiral macromolecular compound according to claim 1, wherein absorption circular dichroism is observed by measuring the circular dichroism (CD).

5. The spiral macromolecular compound according to claim 1 having unidirectionally wound spiral structure wherein direction of winding is controlled in either clockwise or counterclockwise.

6. The spiral macromolecular compound according to claim 5, wherein the syndiotactic polymethacrylate polymer is syndiotactic polymethyl methacrylate (st-PMMA).

* * * * *